United States Patent [19]

Turner et al.

[11] Patent Number: 4,728,166

[45] Date of Patent: Mar. 1, 1988

[54] BRANCHING ELECTRO-OPTIC WAVEGUIDES

[75] Inventors: William D. Turner, San Marino; Robert A. Sprague, Saratoga, both of Calif.

[73] Assignee: Xerox Corporation, Stamford, Conn.

[21] Appl. No.: 376,979

[22] Filed: May 10, 1982

[51] Int. Cl.[4] .............................................. G02B 6/10
[52] U.S. Cl. .............................. 350/96.12; 350/96.14
[58] Field of Search ................ 350/96.12, 96.13, 96.14

[56] References Cited

U.S. PATENT DOCUMENTS 4,127,320 11/1978 Li ........................................ 350/96.13
4,172,630 10/1979 Burns et al. ........................ 350/96.14
4,396,246 8/1983 Holman ........................ 350/96.13 X

FOREIGN PATENT DOCUMENTS 2365971 11/1973 Fed. Rep. of Germany ... 350/96.13

OTHER PUBLICATIONS

"Multimode Achromatic Electro-Optic Waveguide Switch for Fiber-Optic Communications", Applied Physics Letters, vol. 28, No. 12, 15 Jun. 1976.

Primary Examiner—William L. Sikes
Assistant Examiner—Akm E. Ullah

[57] ABSTRACT

A multilayer electrode structure is deposited on or supported in intimate contact with an electro-optic element to define a substantially continuous, transformation-free, branching, fringe field controlled electro-optic waveguide. Transformations are minimized because the fringe field induced waveguiding channels all have substantially equal widths and depths, and discontinuities are reduced by providing bridging electrodes to span any gaps that might otherwise exist in the fringe fields.

9 Claims, 5 Drawing Figures

BRANCHING ELECTRO-OPTIC WAVEGUIDES

FIELD OF THE INVENTION

This invention relates to optical waveguides and, more particularly, to branching electro-optic waveguides for steering and/or switching light beams.

BACKGROUND OF THE INVENTION

As is known, an optical waveguide may be created by coupling electric fields into an electro-optic element, thereby locally increasing its refractive index to produce a waveguiding channel therein. Indeed, others have already proposed or developed fringe field and bulk field controlled branching electro-optic waveguides for steering and/or switching light beams. See, for example, U.S. Pat. No. 3,795,433, which issued Mar. 5, 1974 on "Voltage Induced Optical Waveguide Means," and Donald H. McMahon, "Multimode Optical Switching," *Laser Focus*, March 1979, p. 46 et seq.

IBulk field controlled electro-optic waveguides tend to suffer from a lack of structural strength because they usually comprise a thin electro-optic crystal (i.e., a crystal having a thickness of less than 100 microns or so) which is sandwiched between opposed electrodes. Fringe field controlled waveguides are likely to be sturdier, but branching waveguides of that type typically are relatively lossy devices because of discontinuities in the fringe fields and optical transformations of the guided light.

SUMMARY OF THE INVENTION

In accordance with the present invention, a multilayer electrode structure is deposited on or supported in intimate contact with an electro-optic element to define a substantially continuous, transformation-free, branching, fringe field controlled electro-optic waveguide. Transformations are minimized because the fringe field induced waveguiding channels all have substantially equal widths and depths, and discontinuities are reduced by providing bridging electrodes to span any gaps that might otherwise exist in the fringe fields.

BRIEF DESCRIPTION OF THE DRAWINGS

Still further advantages and features of the present invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
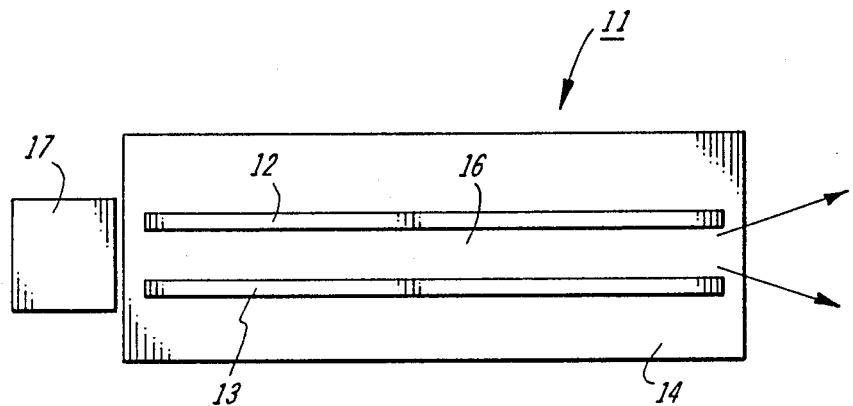
FIG. 1 is a plan view of a more or less conventional fringe field controlled electro-optic waveguide.
Figure 2:
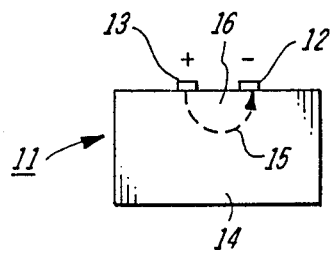
FIG. 2 is a right hand end view of the waveguide shown in FIG. 1.

Turning now to the drawings, and at this point especially to FIGS. 1 and 2, it is known that an electro-optic waveguide 11 may be fabricated by depositing a pair of generally parallel electrodes 12 and 13 on the surface of an electro-optic element 14, such as a crystal of $LiNbO_3$, $LiTaO_3$, BSN, KDP, $KD^xP$, $Ba_2NaNb_5O_{15}$ or PLZT. When a suitable voltage is applied across the electrodes 12 and 13, electric fringe fields are coupled into the electro-optic element 14, as indicated by the broken line 15 (FIG. 2), thereby locally increasing its refractive index to create a waveguiding channel 16. The channel 16 may be used, for example, to guide light emitted by a suitable source, such as a butt coupled diode laser 17, from one end of the electro-optic element 14 to the other. As will be appreciated, any light captured by the channel 16 tends to be guided thereby because of its relatively high index of refraction.

Figure 3:
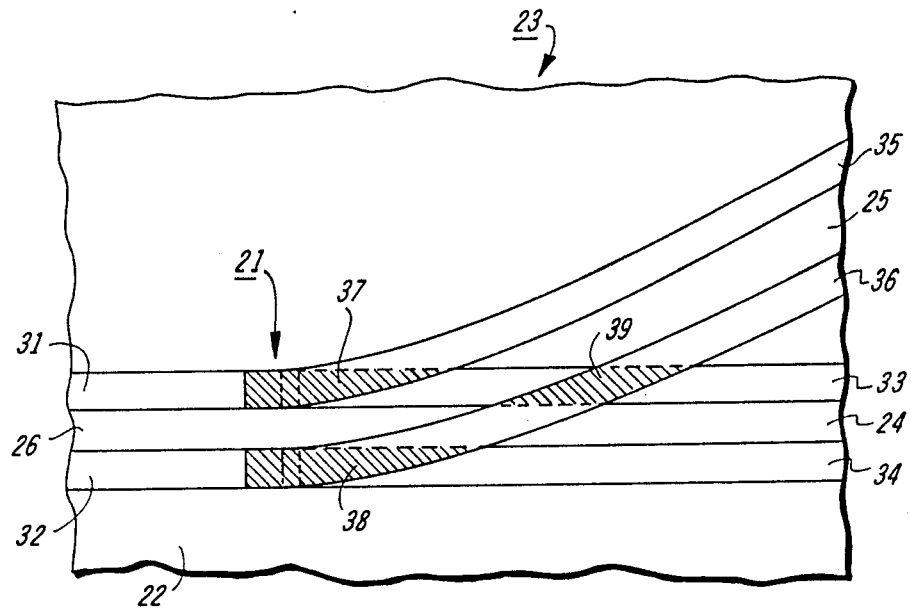
FIG. 3 is a fragmentary layout diagram for a simple branching waveguide which is constructed in accordance with this invention.
Figure 4:
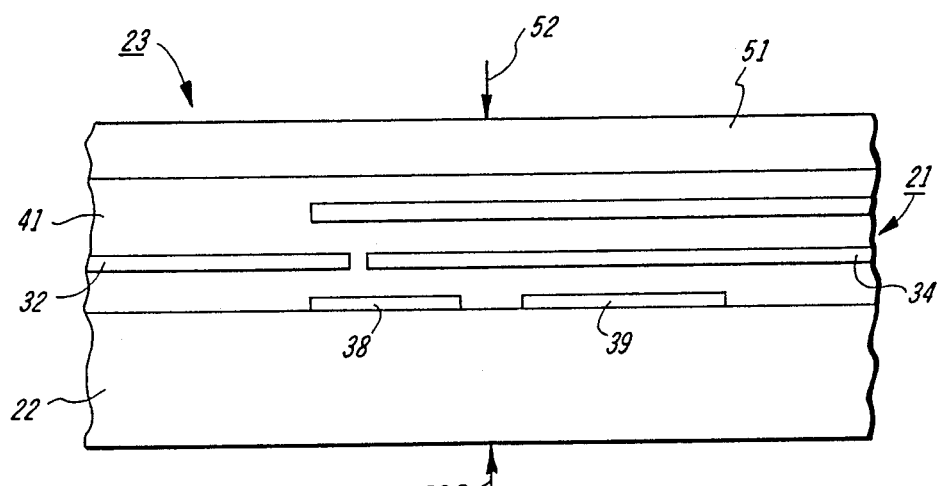
FIG. 4 is an simplified fragmentary elevational view of the waveguide shown in FIG. 3, wherein the electrical insulating medium for the electrodes is treated as being transparent for increased clarity.

Referring to FIGS. 3 and 4, in keeping with this invention, a multilayer electrode structure 21 is deposited on or supported immediately adjacent a surface of an electro-optic element 22 to provide a substantially continuous, transformation free, branching waveguide 23. In this instance, the waveguide 23 is asymmetrical and has a stem channel 24 and a branch channel 25 for guiding light to and from a trunk channel 26. The light may be supplied by a more or less conventional source or sources (not shown) and guided to a suitable detector or detectors (also not shown).

More particularly, to define the waveguiding channels 24-26, the electrode structure 21 comprises a pair of trunk electrodes 31 and 32, a pair of stem electrodes 33 and 34, a pair of branching electrodes 35 and 36, and bridging electrodes 37, 38 and 39 (represented by the cross hatched portions of FIG. 3), all of which are electrically insulated from one another by a suitable insulating medium 41 (FIG. 4). Accordingly, the electrodes 31-39 are electrically independent. As shown, the trunk electrodes 31-32 and the stem electrodes 33-34 are axially aligned and coplanar. In view of the coplanar relationship, the adjacent ends of the electrodes 31-34 are separated by gaps. Contrastingly, the trunk electrodes 31-32 and the branching electrodes 35-36 are non-coplanar, which means that their adjacent ends may be aligned in overlapping or at least gap-free relationship. To ensure that the waveguiding channels 24-26 are of substantially equal and uniform width, a predetermined and essentially constant inter-electrode spacing is maintained between (1) the trunk electrodes 31 and 32, (2) the stem electrodes 33 and 34, and (3) the branching electrodes 35 and 36.

Due to the multilayered electrode structure 21 of the waveguide 23, certain portions of the branching electrodes 35 and 36 are effectively shielded from the electro-optic element 22 by intervening portions of the stem electrodes 33 and 34. Moreover, as previously noted, the ends of the trunk electrodes 31 and 32 are gapped from the adjacent ends of the stem electrodes 33 and 34. Thus, to avoid unwanted discontinuities in the waveguide 23, the bridging electrodes 37-39 are deposited directly on or immediately adjacent the electro-optic element 22 (a) to span the gaps between (i) the electrodes 31 and 33 and (ii) the electrodes 32 and 34 and (b) to span the shielded portions of the electrodes 35-36.

In operation, appropriate voltages are applied across the trunk electrodes 31 and 32 and across the stem electrodes 33 and 34 or across the branching electrodes 35 and 36, thereby creating electric fringe fields which radiate from the energized electrodes and penetrate approximately to a predetermined depth into the electro-optic element 22. For example, to steer a light beam through the trunk channel 26 and into and through either the stem channel 24 or the branch channel 25, energizing voltages are applied across the trunk electrodes 31-32 and across either the stem electrodes 33-34 or the branching electrodes 35-36, depending on the output channel selected for the guided light. Similarly, to selectively switch guided light into the trunk channel 26 from either the stem channel 24 or th branching channel 25, appropriate voltages are applied across the trunk electrodes 31-32 and across either the stem electrodes 33-34 or the branching electrodes 35-36, depending on the input channel selected for the guided light.

In keeping with one of the more detailed aspects of this invention, appropriate voltage levels are maintained on the bridging electrodes 37-39 under all operating conditions of the waveguide 23, so that the fringe fields radiating therefrom are of the same polarity as those that are radiating from the overlying energized electrodes. In view of the foregoing, it should be noted that provision (not shown) is made for reversing the relative polarity of the bridging electrode 39 depending on whether the trunk channel 26 is being coupled to stem channel 24 or to the branch channel 25, so that the relative polarity of the electrode 39 matches that of the active overlying electrode 33 or 36.

To simplify the electrical interface of the waveguide 23, electrically insulated metallization layers of suitable substrate, such as a large scale integrated (LSI) silicon circuit 51, may be patterned to define the electrodes 31-39. Here, for example, a first metallization is patterned to define the branching electrodes 35-36, a second metallization is patterned to define both the trunk electrodes 31-32 and the stem electrodes 33-34, and a third and final metallization is patterned to define the bridging electrodes 37-39. As will be appreciated, one of the principal advantages of this approach is that standard LSI techniques can be used to make the necessary electrical connections to the electrodes 31-39. Moreover, the LSI circuit 51 may be pressed or otherwise firmly held against the electro-optic element 22, as indicated by the arrows 52 and 53 (FIG. 4), to "proximity couple" the waveguide defining fringe fields into the electro-optic element 22. See a copending and commonly assigned U.S. patent application of R. A. Sprague et al., which was filed Sept. 17, 1980 under Ser. No. 188,171 on "Integrated Electronics for Proximity Coupled Electro-Optic Devices."

Figure 5:
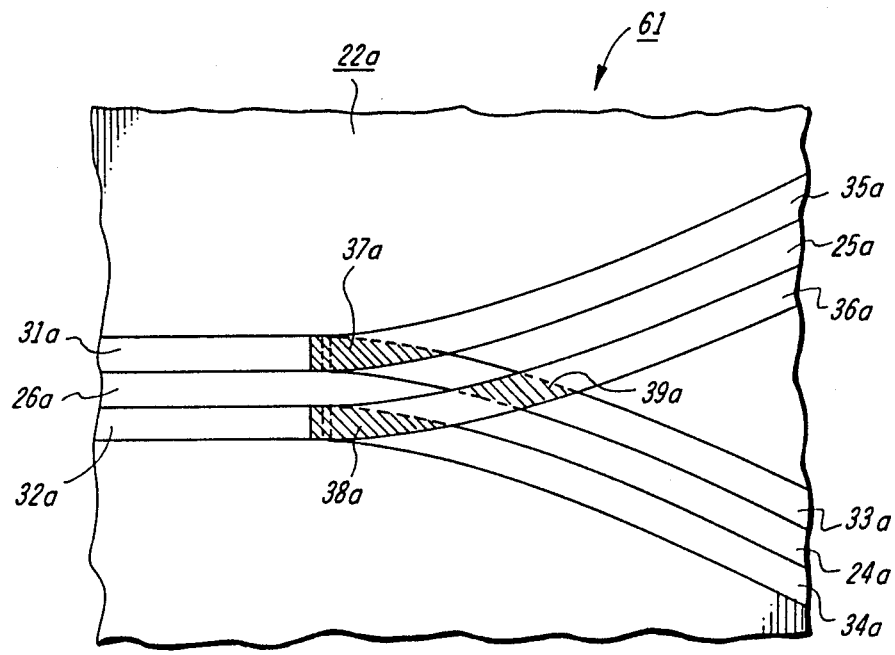
FIG. 5 is a fragmentary layout diagram of another embodiment of the present invention.

Turning to FIG. 5, the present invention also may be advantageously utilized to provide substantially continuous, transformation-free, symmetrical and asymmetrical, dual branch, fringe field controlled, electro-optic waveguides, such as the waveguide 61. The waveguide 61 is similar in construction and operation to the above described waveguide 23. Accordingly, to avoid repetition, like reference numerals have been used to identify like parts. Nevertheless, to negate any inference that the waveguide 61 is structurally identical to the waveguide 23, the suffix "a" has been appended to the reference numerals which have been taken from FIGS. 3 and 4 for use in FIG. 5.

CONCLUSION

In view of the foregoing, it will now be understood that this invention provides relatively low loss, fringe field controlled, branching electro-optic waveguides. While only single junction waveguides have been described, it will be evident that such waveguides may be cascaded and otherwise combined to provide multiple junction waveguides having almost any practical configuration and almost any reasonable number of input branches, output branches and intermediate branches. Furthermore, it will be apparent that a branching waveguide could be configured in accordance with the present invention without having trunk-like waveguiding channels leading toward and away from each and every branching junction. For example, a laser light source could be butt coupled directly to such a junction.

What is claimed is:

1. An optical waveguide comprising
   an electro-optic element, and
   a multiple layer electrode structure located on one side of said electro-optic element, said electrode structure being intimately associated with said electro-optic element for producing electric fringe fields to create a plurality of waveguiding channels within said electro-optic element;
   said electrode structure having at least two electrically independent pairs of electrodes which reside within first and second layers, respectively, of said electrode structure and which branch out from one another as viewed from the electro-optic element, said layers of said electrode structure being disposed one above the other relative to said electro-optic element.

2. The waveguide of claim 1 wherein
   all of said electrode pairs have substantially the same, generally constant, interelectrode spacing, whereby said waveguiding channels are essentially free of optical transformations.

3. The waveguide of claim 2 wherein
   predetermined portions of a first of said electrode pairs are shielded from said electro-optic element by the other of said electrode pairs, and
   said electrode structure further includes bridging electrodes immediately adjacent said electro-optic element for spanning said shielded portions of said first pair of electrodes.

4. The waveguide of claim 3 wherein
   said electrode structure further includes a third pair of electrodes which are coplanar with one of said two electrode pairs,
   said coplanar electrode pairs have adjacent ends separated from one another by gaps, and
   certain of said bridging electrodes span said gaps.

5. The waveguide of claim 1 wherein
   said electrode structure further includes a substrate for supporting said electrodes, and
   said electrode structure is intimately engaged with said electro-optic element to proximity couple said fringe fields into said electro-optic element.

6. The waveguide of claim 5 wherein
   predetermined portions of a first of said electrode pairs are shielded from said electro-optic element by the other of said electrode pairs,
   said electarode structure further includes a layer of bridging electrodes immediately adjacent said electro-optic element, and each of the shielded portions of said first pair of electrodes is spanned as viewed from said electro-optic element by a respective one of said bridging electrodes.

7. The waveguide of claim 6 wherein
all of said electrode pairs have substantially the same, generally constant, interelectrode spacing, whereby said waveguiding channels are essentially free of optical transformations.

8. The waveguide of claim 6 wherein said electrode structure further includes a third pair of electrodes which are coplanar with one of said two electrode pairs,
said coplanar electrode pairs have adjacent ends separated from one another by gaps, and
certain of said bridging electrodes span said gaps as viewed from said electro-optic element.

9. The waveguide of claim 8 wherein
all of said electrode pairs have substantially the same, generally constant, interelectrode spacing, whereby said waveguiding channels are essentially free of optical transformations.

* * * * *